United States Patent [19]
Chalasani et al.

[11] Patent Number: 5,824,143
[45] Date of Patent: Oct. 20, 1998

[54] METHOD FOR COMPOUNDING CERAMIC POWDER BATCHES

[75] Inventors: Devi Chalasani, Painted Post; Robert J. Locker, Corning; Constance B. Sawyer, Lindley, all of N.Y.

[73] Assignee: Corning Incorporated, Corning, N.Y.

[21] Appl. No.: 951,878

[22] Filed: Oct. 17, 1997

Related U.S. Application Data

[60] Provisional application No. 60/030,194 Nov. 4, 1996.

[51] Int. Cl.$^6$ .................... C09D 101/28; C09D 101/00; C04B 35/636; C04B 35/628
[52] U.S. Cl. ................... 106/181.1; 106/203.3; 264/177.11; 264/177.12; 264/211; 501/32; 501/88; 501/97.1; 501/103; 501/106; 501/109; 501/125; 501/127; 501/128; 501/133; 501/141; 501/153; 501/154
[58] Field of Search ............... 106/181.1, 203.3; 264/177.11, 177.12, 211; 501/33, 88, 97.1, 103, 106, 108, 125, 127, 128, 133, 141, 153, 154

[56] References Cited

U.S. PATENT DOCUMENTS

| | | |
|---|---|---|
| 3,885,977 | 5/1975 | Lachman et al. . |
| 4,492,783 | 1/1985 | Tanaka et al. ............... 524/430 |
| 4,496,506 | 1/1985 | Sakato et al. . |
| 4,902,459 | 2/1990 | Matsubara et al. . |
| 5,091,346 | 2/1992 | Inoue et al. . |
| 5,209,885 | 5/1993 | Quadir et al. . |
| 5,278,250 | 1/1994 | Ohtani et al. . |
| 5,316,993 | 5/1994 | Sextl et al. . |
| 5,344,799 | 9/1994 | Wu . |
| 5,401,697 | 3/1995 | Guether et al. . |
| 5,589,222 | 12/1996 | Thometzek et al. ............... 427/215 |
| 5,609,807 | 3/1997 | Wada et al. ............... 264/211.11 |

FOREIGN PATENT DOCUMENTS

| | | |
|---|---|---|
| 0019674 | 12/1980 | European Pat. Off. . |
| 0 652 191 A | 5/1995 | European Pat. Off. . |

OTHER PUBLICATIONS

"Polymer Adsorption Behavior in a Multicomponent Particle System", Am. Cer. Soc. Bull. 75, 3 (Mar. 1996), p. 253.
"Adsorption Characteristics of Hydroxypropyl Methylcellulose on Alumina, Talc, Kaolin and Silica", C.B. Sawyer, M.S. Dissertation, Alfred University, Alfred, NY (Apr. 1994).

*Primary Examiner*—David Brunsman
*Attorney, Agent, or Firm*—Kees van der Sterre

[57] ABSTRACT

Plasticized inorganic powder batches comprising a cellulosic binder, water, and at least one inorganic powder exhibiting relatively high water affinity are compounded by combining the inorganic powder, prior to any contact with the water or cellulosic binder, with an organic surface treatment agent to decrease the water affinity thereof; subsequent mixing of the treated powder with the water and the cellulosic binder forms a plasticized inorganic powder batch with improved extrusion, molding, or other shaping characteristics.

18 Claims, 2 Drawing Sheets

METHOD FOR COMPOUNDING CERAMIC POWDER BATCHES

This application claims the benefit of U.S. Provisional Application No. 60/030,194, filed Nov. 4, 1996, entitled "Method for Compounding Ceramic Powder Batches", by Devi Chalasani, Robert J. Locker and Constance B. Sawyer.

BACKGROUND OF THE INVENTION

The present invention relates to the processing of inorganic powder batches. More particularly, the invention relates to a method of compounding ceramic powder/organic binder batches with powder pre-treating agents to provide plasticized powder batches offering substantially improved shaping behavior for shaping processes such as extrusion.

The extrusion behavior of batches comprising insoluble particulates mixed with liquid or plastic organic/inorganic vehicles has classically been dealt with in qualitative terms. Several techniques are currently used to assess the extrusion behavior of such batches; these include torque rheometry, capillary rheometry, and modulus tests on extruded ribbons. On a comparative basis, these tests are useful to rate one batch against another, but they do not offer any insight into what makes a batch behave well. Thus it is difficult to identify solutions to extrusion behavior problems from these tests.

Physical chemistry indicates that organic compounds interact with surfaces in one of two ways, either through enthalpic or entropic reactions. Enthalpic reactions are ones in which there is some reaction in which a change in thermal energy occurs, while entropic reactions are dictated by a change in free energy of the system. The nature of these interactions may in fact be responsible for some of the observed effects of organic additions to inorganic systems but, in general, the effects resulting from any particular addition to any particular system are not predictable, for systems of any degree of complexity.

An important class of plasticizing/binding ingredients used in the formulation of inorganic powder batches includes cellulosic binders such as methylcellulose. As disclosed in U.S. Pat. No. 3,885,977, this compound has long been used as a plasticizer in the formulation of mineral (clay-talc) batches used for the extrusion of ceramic honeycomb products. In fact, methylcellulose continues to be widely used even in more advanced batch formulations. Thus U.S. Pat. No. 5,344,799 describes a vehicle system for inorganic (mineral) batches of similar composition which comprises a combination of methylcellulose with additional lubricants and extrusion aides such as sodium stearate, oleic acid, and oleic acid derivatives.

Notwithstanding the commercial importance of these cellulosic binders, a full understanding of their role in promoting good extrusion behavior in ceramic powder batches has not yet been developed. What is known is that methylcellulose acts as a surface active or interfacial agent in aqueous solutions of ceramic powders, including glass powders and mineral powders. Also known is the fact that, given the opportunity, methylcellulose will migrate to interfaces between liquid and other phases, whether solid or gaseous. This is presently understood to occur because the organic side groups along the methylcellulose molecular chain attempt to shield themselves from the polar water molecules.

New wet chemical tests have been designed to analyze for methylcellulose, and investigations have been conducted to better understand its role in extrusion batches. These studies have revealed a tendency of methylcellulose to bind to the surfaces of minerals such as talc, in preference to minerals such as alumina, in aqueous inorganic powder systems containing both of these constituents.

SUMMARY OF THE INVENTION

The present invention provides methods for modifying the behavior of plasticizing cellulosic binders such as methylcellulose in aqueous ceramic powder systems, those modifications being effective to significantly improve the plasticizing effectiveness of the binders. The result is a significant improvement in extrusion behavior, at lower binder levels than previously required. Batch costs are thereby reduced, while product selects are improved.

In these systems, it appears that good extrusion behavior requires reductions in free (unbound) cellulose in the aqueous phase, in combination with increased concentrations of interfacial or bound cellulose at adsorption sites on the surfaces of the various powders present in the system. Cellulose redistribution is encouraged by means of surface treatments applied to hydrophilic powder components of the system, to render them more hydrophobic and amenable to cellulose adsorption.

In a first aspect, then, the invention includes a method for compounding a plasticized inorganic powder batch comprising a cellulosic binder, water, and at least one inorganic powder of having a relatively high water affinity. Powders having a water affinity higher than, for example, talc (MgO-SiO2) are considered to be of relatively high water affinity, and may be beneficially processed in accordance with the invention.

The method of the invention generally comprises, prior to contacting the inorganic powder with water or a cellulosic binder, contacting the powder with an organic surface treatment agent to decrease the water affinity thereof. Thereafter, the powder is combined and mixed with water and the selected cellulosic binder component or components to form the plasticized inorganic powder batch.

In a particularly preferred embodiment, the invention comprises a method for compounding a plasticized inorganic powder batch comprising a cellulosic binder, water, and two or more inorganic powders of differing water affinity. That method comprises first selecting from among the inorganic powders at least a first powder having a water affinity higher than the water affinity of at least one remaining powder, and treating that first powder with an organic surface treatment agent to decrease the water affinity thereof. This surface treatment would be applied prior to contacting the treated powder with water or cellulosic binder. Thereafter, the treated (first) powder may be combined and mixed with the remaining inorganic powder or powders, water and cellulosic binder components of the batch in any desired order, thereby to form the plasticized inorganic powder batch.

Principal benefits of this approach to powder batch plasticization include an improved ability of the cellulosic binders to act as lubricants for reducing inter-particle shear, through more uniform distribution of the binder over all powder surfaces. At the same time, the shift of cellulosic binders out of the aqueous phase and onto adsorption sites on the powders lowers the adhesive tendency of the batch, i.e., makes it less sticky. Both effects cooperate to improve forming behavior, particularly in the case of fine-structure forming processes such as thin-wall honeycomb extrusion.

DETAILED DESCRIPTION

An important discovery underlying the present invention relates to the unusual behavior of talc in clay-talc extrusion batches such as disclosed in the aforementioned patents. Talc has been found to preferentially remove methylcellulose from aqueous solutions, through the mechanism of strong surface adsorption of the cellulose onto the surfaces of the talc particles. This adsorption can occur to the substantial exclusion of cellulose adsorption on other particle surfaces. For example, analyses of kaolin clays in similar aqueous systems shows a reduced methylcellulose adsorption level as compared to talc, while alumina powders showed almost no methylcellulose adsorption in such systems. Further, in systems comprising both alumina and talc powders, methylcellulose adsorption even by the talc fraction was dramatically reduced, a result perhaps due to interference by the alumina particles with methylcellulose adsorption by the talc.

The large differences adsorption behavior among these inorganic powders is presently attributed to the differences in water affinity of the various powder surfaces. Talc is hydrophobic in nature, while both kaolin clays and, particularly, alumina powders tend to be hydrophilic. This conclusion is further supported by the fact that, when surface-treated to reduce its hydrophilic nature, the methylcellulose adsorption of alumina can be increased to nearly the levels observed with talc.

The differences in methylcellulose adsorption behavior in aqueous systems incorporating inorganic powders can be demonstrated by means of calorimetric optical absorption techniques. Representative powders exhibiting these differences include A16-SG alumina, commercially obtainable from the Aluminum Company of America (ALCOA), Pittsburgh, Pa., ASP 400J kaolin, commercially obtainable from the Engelhard Corporation, Gordon, Ga., FDCJ talc, commercially obtainable from Luzenac North America, Penhorwood, Ontario, Canada, and ImsilJ silica, commercially obtainable from Unimin Specialty Minerals, Elco, Ill.

Each of these powders in turn was incorporated into an aqueous powder slurry at a solids loading of 10 volume %, and a methylcellulose binder was then added to each slurry to achieve selected equilibrium concentrations of methylcellulose in the aqueous phase. The methylcellulose employed was Methocel7 F40M hydroxymethyl methylcellulose, commercially available from the Dow Chemical Company, Midland, Mich.

Figure 1:
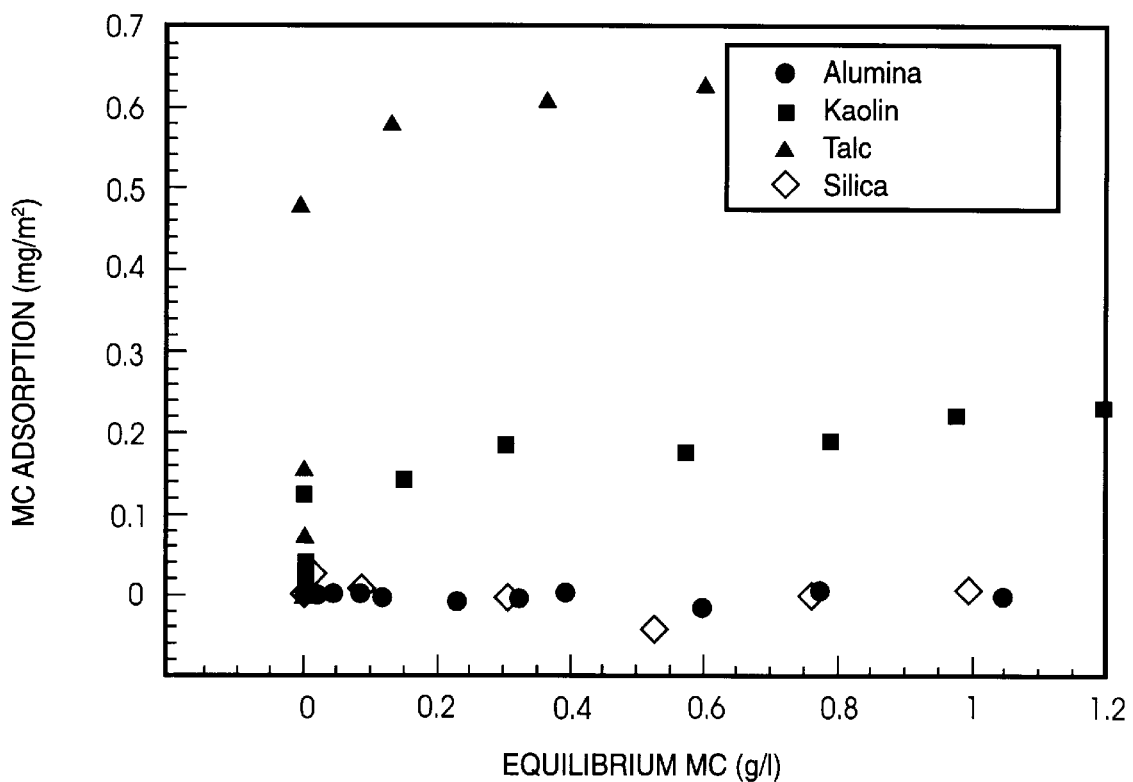
FIG. 1 plots the levels of methylcellulose adsorption observed for each of the inorganic powders tested.

FIG. 1 of the drawing plots the levels of methylcellulose adsorption observed for each of the inorganic powders tested, the plot covering a range of dissolved methylcellulose concentration levels from zero (all methylcellulose adsorbed) to 1.2 grams/liter. The equilibrium methylcellulose concentration levels for each powder test slurry are reported in grams/liter of solution as EQUILIBRIUM MC on the x-axis of the graph; the amount of methylcellulose adsorbed at each concentration level is reported in milligrams/square meter of powder surface area on the y-axis.

The adsorption data indicate that, for all of these materials, a plateau or maximum level of methylcellulose adsorption is reached which cannot be significantly increased despite increases in the amount of dissolved methylcellulose present. In the case of the talc slurry, the methylcellulose adsorption level approaches 0.7 milligrams/$m^2$, with significant adsorption (up to 0.48 milligrams/$m^2$) being attainable before any free methylcellulose is detectable in the aqueous phase.

In contrast, the kaolin clay slurry shows adsorption at only about one-third of the levels achieved by the talc at corresponding dissolved methylcellulose concentrations, while the silica and alumina powders exhibited essentially no methylcellulose adsorption even at the maximum concentrations of dissolved methylcellulose.

Figure 2:
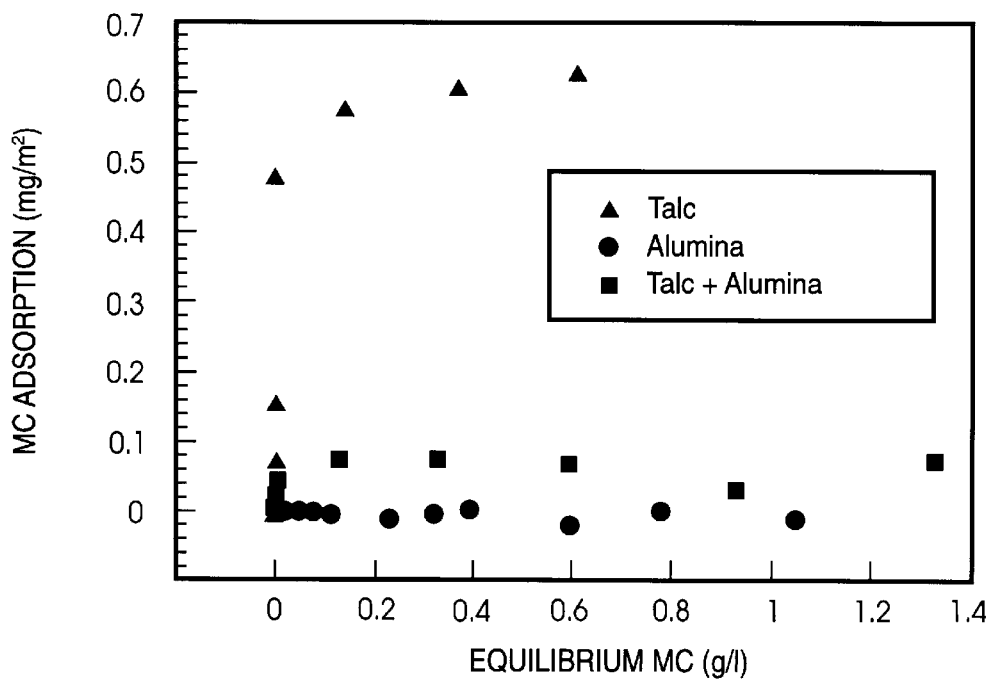
FIG. 2 compares adsorption data for the talc and alumina slurries with methylcellulose adsorption data for a slurry containing a mixture of talc and alumina powders at a combined level of 10 volume %.

FIG. 2 of the drawing compares adsorption data for the talc and alumina slurries with methylcellulose adsorption data for a slurry containing a mixture of the talc and alumina powders at a combined 10 volume % level. The values plotted on the x and y axes of the drawing correspond dimensionally to those shown in FIG. 1. The plot for the mixed slurry suggests that alumina not only resists significant methylcellulose adsorption itself, but also interferes with methylcellulose adsorption by the talc. This effect is quite undesirable to the extent that it increase the amount of methylcellulose in solution and therefore increases the "stickiness" of the batch.

In order to improve cellulose adsorption onto particle surfaces for inorganic particulates exhibiting low affinity for cellulosic binders, a surface pre-treatment of the particulate is employed. In general, the material used for the surface pre-treatment will be an organic surface treatment agent, that agent being provided in a form which can be conveniently applied to the selected powder to provide a hydrophobic surface coating thereon. In general, these are liquid or solid organic compounds or mixtures exhibiting liquid flow at temperatures below their decomposition temperatures and exhibiting good coating adherence to hydrophilic powder surfaces. The particular agent selected will depend in part on the selection of the powder materials to be blended, and upon the specific cellulosic binders to be incorporated, but the most effective surface treatment agent for any particular powder or powder system can readily be determined by means of binder adsorption experiments such as described above for the testing of clay, talc, alumina and silica powders.

Powders useful in aqueous powder batches and amenable to surface pre-treatment for improved binder performance prior to incorporation therein include powders of ceramic, glass-ceramic or glass, or mineral origin. These may include, for example, powders of cordierite, mullite, clay, talc, zircon, zirconia, spinel, alumina, silica, silicate, aluminate, aluminosilicates, lithium aluminosilicate, feldspar, titania, fused silica, silicon carbide, silicon nitride or similar composition.

For the production of extruded cordierite ceramic honeycomb structures in accordance with the aforementioned patents, powder mixtures of clay, talc and alumina which can be converted to cordierite on firing are currently used. Specific powders used in these mixtures include non-delaminated kaolinite raw clays having particle sizes of about 7–9 micrometers such as Hydrite MP™ clay, delaminated kaolinites having particle sizes of about 1–3 micrometers such as KAOPAQUE-10™ clay, and calcined kaolinite clays having particle sizes of about 1–3 micrometers such as GlomaxJ LL clay, all of these particular clays being obtainable from the Dry Branch Kaolin Company of Dry Branch, Ga.

Examples of particular alumina powders suitable for pre-treatment and use in accordance with the invention include the Alcan C-700J series aluminas having relatively large particle sizes (4–6 micrometers), exemplified by C-701™ alumina and being commercially obtainable from ALCOA, and relatively fine aluminas having particle sizes of about 0.5–2 micrometers, exemplified by A-16SGJ alumina which is commercially obtainable from the same source. A typical silica powder is IMSIL™ silica powder having a particle size of about 9–11 micrometers, commercially available from Unimin Specialty Minerals.

Useful talcs, which as noted above do not normally require surface treatment to provide good surface characteristics for cellulose binder adsorption, include those with particle size of about 6–8 micrometers such as Pfizer talcs 95-27, and 95-28 commercially available from Pfizer Inc., Dillon, Mont. Some of these powders, notably the clays, can themselves impart some plasticity to water-based powder mixtures prepared for forming.

Dry blending is a preferred approach for applying the desired hydrophobic surface coating to hydrophilic powders, although other methods for coating particulates, including for example the application of a coating from a solution of a surface treatment agent in an appropriate non-aqueous solvent or vehicle may alternatively be employed. In either case, however, the surface coating will be applied in the substantial absence of moisture, either in the form of water or as water vapor, since surface-adsorbed water is likely to interfere with the effectiveness of the surface treatment process.

The quantity of organic surface treatment agent required for each batch mixture is dependent on factors relating to the relative proportions and surface characteristics of the hydrophilic powders present in the batch. Again, however, the optimum proportions can readily be determined by routine experiment. Among the organic surface treatment agents especially suited to the practice of the present invention are oleic acid, oleic acid derivatives, and combinations of these. Typical oleic acid derivatives are linoleic acid, linolenic acid, and ricinoleic acid. The particularly preferred surface treatment agent is oleic acid.

Cellulosic binders which are advantageously promoted by organic surface treatment agents in accordance with the invention are binders of the cellulose ether type. Examples of such binders, many of which are thermally gellable, include methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, and sodium carboxy methylcellulose.

Methylcellulose and/or methylcellulose derivatives are particularly preferred binder components of the powder batches of the invention. Commercially available examples of such compounds include Methocel[7] A4M, 20-333, F4 and F40 cellulose materials, available from the Dow Chemical Co of Midland, Mich. Methocel[7] A4M methylcellulose is a methylcellulose binder having a gel temperature of 50°–55° C., and a gel strength of 5000 g/cm$^2$ (based on a 2% solution at 65° C.) . Methocel[7] 20-333, F4, and F40 are hydroxypropyl methylcellulose formulations. For clay-talc batches of the type used for cordierite honeycomb production, these the cellulosic binders will typically be added to the powder batch, subsequent to the surface pre-treatment of selected hydrophilic powder batch fractions, in proportions of about 2% to about 10% of batch weight. Binder additions may be made prior to, concurrently with, or subsequent to the addition of water to the batch.

The effectiveness of powder pre-treatment in accordance with the invention can be shown by comparing the methylcellulose adsorption behavior of an untreated alumina powder, which is highly hydrophilic, with the adsorption behavior of the same powder after treatment with an appropriate surface treatment agent. For this purpose, a quantity of untreated A16-SG alumina and an equivalent quantity of a pre-treated A16-SG powder are dispersed in water to form slurries of each powder at a loading of about 10 volume % solids. The surface-treated alumina powder was prepared by adding about 0.5 pphi (parts per hundred inorganics)) of oleic acid to the powder to be treated, addition being accomplished by spraying the acid onto the alumina while the latter is being processed in a double-arm blender. Blending of the powder and oleic acid is continued for 20 minutes, a period effective to disperse the organic agent over a substantial fraction of the available surface area of the alumina powder.

Following slurrying of each of the alumina powders with water, the methyl cellulose adsorption behavior of the two aluminas is compared by adding a methylcellulose binder to each slurry to achieve preselected levels of dissolved methylcellulose in the water phase, as described above for the clay. talc and silica powders. At each preselected level of dissolved methylcellulose, the amount of methylcellulose adsorbed on the solid phase is determined.

Figure 3:
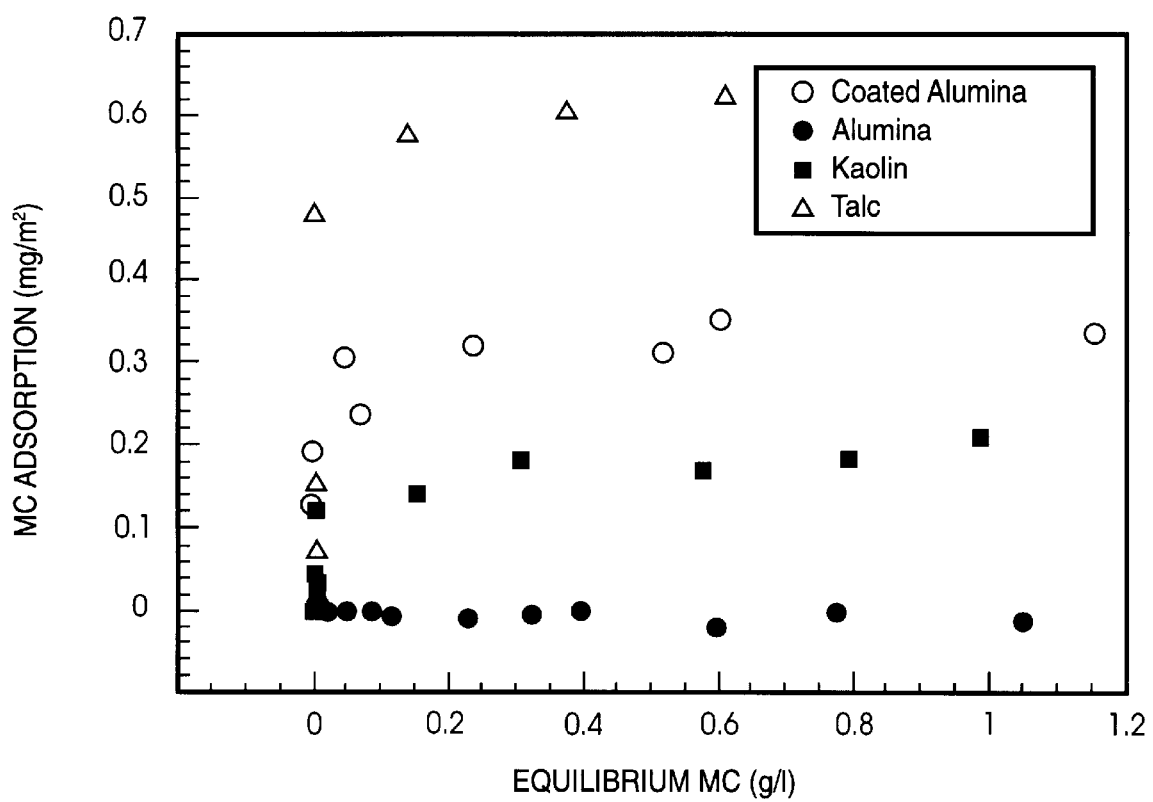
FIG. 3 compares the adsorption behavior of two aluminas with the adsorption behavior of untreated talc and kaolin clay powders.

FIG. 3 of the drawing compares the adsorption behavior of these two aluminas, together with the adsorption behavior of untreated talc and kaolin clay powders. Again, the concentration of unbound methylcellulose in the aqueous phase is reported on the x-axis of the graph, while the extent of methylcellulose adsorption is shown by the y-axis. While the untreated alumina again exhibits substantially no adsorption of the methylcellulose binder, the treated alumina exhibits excellent binder adsorption, exceeding the untreated kaolin clay and approaching the hydrophobic talc in terms of its binder adsorption capacity.

Of course, the pre-treatment of powders for incorporation into batch mixtures comprising aqueous vehicles need not be limited to only the most hydrophilic of the powders. In many cases it may be desirable to treat two or more components of the powder batch to bring all of the batch constituents to at least a minimum level of adsorption capacity. The following is an example of the preparation of a plasticized powder extrusion batch for the manufacture of a cordierite ceramic article using this approach.

EXAMPLE

Oleic acid is added in a proportion of about 0.25 pphi to the alumina and clay components of a clay-talc-alumina powder batch formulated for the production of a cordierite ceramic article. The powder batch included about 41% talc, about 31% of a calcined clay, about 15% of a raw clay and about 13% of alumina powder. The raw clay and alumina fractions, comprising KAOPAQUE-10J clay from the Dry Branch Kaolin Company and A-16SG alumina from ALCOA were individually treated by spraying with the oleic acid while blending in a double arm mixer, and the thus coated powders were then combined with the remaining powders clay and talc powders. After the powders are blended, water, a sodium stearate lubricant, and a hydroxymethyl cellulose binder in a proportion of about 3% of batch weight are added to the batch with thorough mixing to form a plasticized mass.

The advantageous effects of pre-treating the alumina and clay powders with the oleic acid surface treatment agent are evident throughout the blending and forming of the batch. Batch sticking in the blender was significantly reduced, due to reductions in the proportion of free cellulose binder in the water phase of the mixture. In extrusion experiments conducted with similarly formulated batches in a twin-screw extruder supplying batch material directly to a honeycomb extrusion die, it was found that batch sticking to the surfaces of the extruder screws was significantly reduced. Reduced sticking helps to maintain screw mixing efficiency, and prevents prolonged residence of portions of the batch stream within the extruder.

These various findings indicate that increasing the hydrophobicity of hydrophilic powder surfaces prior to combining the powders with water and cellulosic binder materials can significantly improve the handling characteristics of the resulting powder batches. We attribute this result to the reductions in free binder concentrations in the aqueous phase, and the corresponding increases surface-bound binder material, changes which appear to promote more efficient plasticization and reduced adhesion effects within the batch. Increasing surface-bound binder concentrations leads to more efficient use of the available binders, and should help to lower amounts of binder which will be required. Improvements in formed product wet strength with correspondingly improved handling characteristics are also anticipated.

The use of the invention may offer particular advantages for the extrusion of glass rather than mineral powders, since glass powders tend to be more hydrophilic than mineral powders such as talc. Batches incorporating untreated silicate glass powders can require up to 10% (weight) or more of cellulosic binders to produce extrudable mixtures. These high binder concentrations lead to high shrinkage and binder burnout problems as the extruded batches are fired to produce glass or ceramic products. Reductions in binder levels through appropriate pre-treatment of the powders with organic surface treatment agents should significantly improve product yields from these processes.

Still another aspect of the invention relates to the use of cellulose adsorption behavior as a screening tool for selecting materials to be incorporated into powder mixtures comprising aqueous cellulosic binding systems. The selection of powders offering a relatively high affinity for cellulosic binding agents, or powders more amenable to surface pre-treatment to enhance methylcellulose binding, can provide blended batches with substantially improved handling characteristics, whether for extrusion forming or other shaping processes involving the use of molds or other tooling to shape the powder mixtures.

We claim:

1. A method for compounding a plasticized inorganic powder batch comprising a cellulosic binder, water, and at least one inorganic powder exhibiting hydrophilic surface behavior which comprises the steps of:
   prior to contacting the inorganic powder with water or cellulosic binder, contacting the powder with an organic surface treatment agent to decrease the water affinity thereof; and thereafter
   combining and mixing the powder with water and the cellulosic binder to form the plasticized inorganic powder batch.

2. A method in accordance with claim 1 wherein the organic surface treatment agent is an agent which forms a hydrophobic surface coating on an inorganic powder when applied to the surfaces of the powder.

3. A method in accordance with claim 1 wherein the organic surface treatment agent is a liquid or solid organic compound or mixture exhibiting liquid flow at a temperature below its decomposition temperature and coating adherence to a hydrophilic powder surface.

4. A method in accordance with claim 1 wherein the organic surface treatment agent is selected from the group consisting of oleic acid, oleic acid derivatives, and mixtures thereof.

5. A method in accordance with claim 1 wherein the organic surface treatment agent comprises an oleic acid derivative selected from the group consisting of linoleic acid, linolenic acid, and ricinoleic acid.

6. A method in accordance with claim 1 wherein the powder is contacted with the organic surface treatment agent by dry blending a mixture of the agent and the powder.

7. A method in accordance with claim 1 wherein the powder is contacted with the organic surface treatment agent by combining the powder with a solution or suspension of the agent.

8. A method in accordance with claim 6 wherein the powder is combined with the organic surface treatment agent in the substantial absence of moisture.

9. A method in accordance with claim 1 wherein the inorganic powder is a powder selected from the group consisting of ceramic, glass-ceramic, glass, and mineral powders.

10. A method in accordance with claim 1 wherein the inorganic powder is selected a powder selected from the group consisting of silica, silicate, feldspar, fused silica, and mixtures thereof.

11. A method in accordance with claim 1 wherein the cellulosic binder is selected from the group consisting of methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof.

12. A method in accordance with claim 1 wherein the inorganic powder is a powdered glass.

13. A method in accordance with claim 1 wherein the cellulosic binder is selected from the group consisting of methylcellulose and methylcellulose derivatives.

14. A method for compounding a plasticized inorganic powder batch comprising a cellulosic binder, water, and two or more inorganic powders of differing water affinity which comprises the steps of:
   selecting from among the inorganic powders at least a first powder having a water affinity higher than the water affinity of at least one remaining powder;
   prior to contacting the first powder with water or cellulosic binder, contacting the powder with an organic surface treatment agent to decrease the water affinity thereof; and
   combining and mixing the first powder with the remaining inorganic powder, water and cellulosic binder components of the batch to form the plasticized inorganic powder batch.

15. A method in accordance with claim 14 wherein at least two of the inorganic powders are treated with an organic surface treatment agent.

16. A method in accordance with claim 14 wherein the inorganic powders comprise a mixture of clay, talc and alumina.

17. A method in accordance with claim 16 wherein the clay is selected from the group consisting of non-delaminated kaolinites, delaminated kaolinites, calcined kaolinites, and mixtures thereof.

18. A method for compounding a plasticized inorganic powder batch comprising a cellulosic binder, water, and at least one inorganic powder having a water affinity higher than talc (MgO-SiO2) which comprises the steps of:

prior to contacting the said one inorganic powder with water or cellulosic binder, contacting the powder with an organic surface treatment agent to decrease the water affinity thereof; and thereafter combining and mixing the powder with water and the cellulosic binder component to form the plasticized inorganic powder batch.

\* \* \* \* \*

UNITED STATES PATENT AND TRADEMARK OFFICE
CERTIFICATE OF CORRECTION

PATENT NO : 5,824,143
DATED : October 20, 1998
INVENTOR(S): . Chalasani et al.

It is certified that error appears in the above-identified patent and that said Letters Patent is hereby corrected as shown below:

Column 8, lines 30-32, claim 10, "inorganic powder is selected a powder selected from the group consisting of silica, silicate, feldspar, fused silica, and mixtures thereof." should be
--inorganic powder is selected a powder selected from the group consisting of cordierite, mullite, clay, talc, zircon, zirconia, spinel, alumina, silica, silicate, aluminate, aluminosilicates, lithium aluminosilicate, feldspar, titania, fused silica, silicon carbide, silicon nitride, and mixtures thereof.--

Signed and Sealed this

Twenty-sixth Day of October, 1999

Attest:

Q. TODD DICKINSON

Attesting Officer

Acting Commissioner of Patents and Trademarks